Sept. 2, 1969  J. C. HUBBART  3,464,142
ANGLING DEVICE
Filed Aug. 4, 1967  2 Sheets-Sheet 1
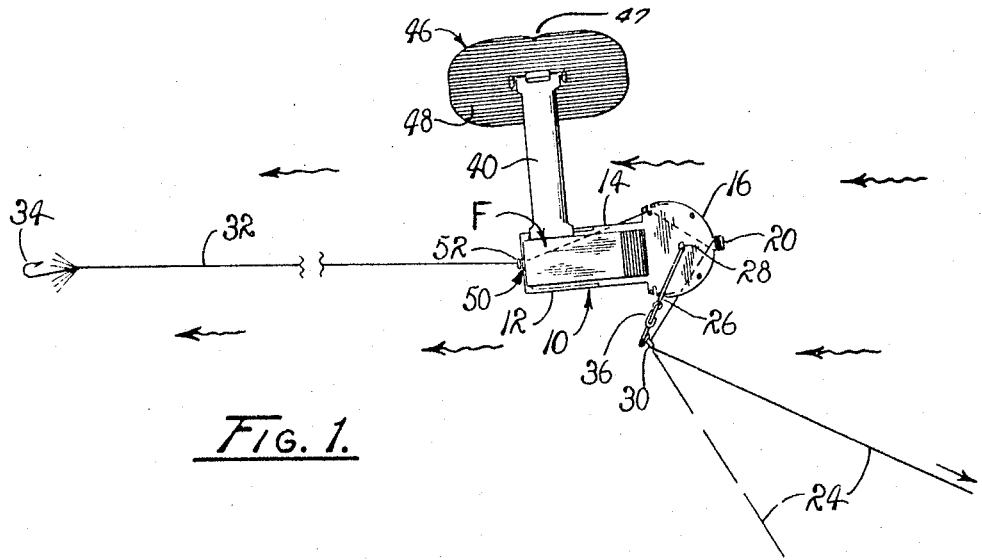
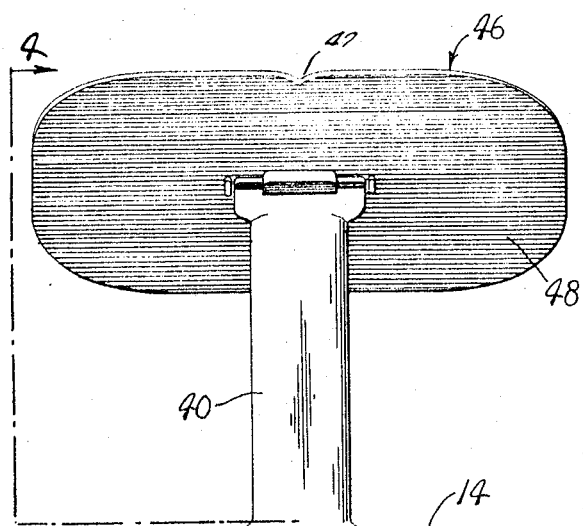
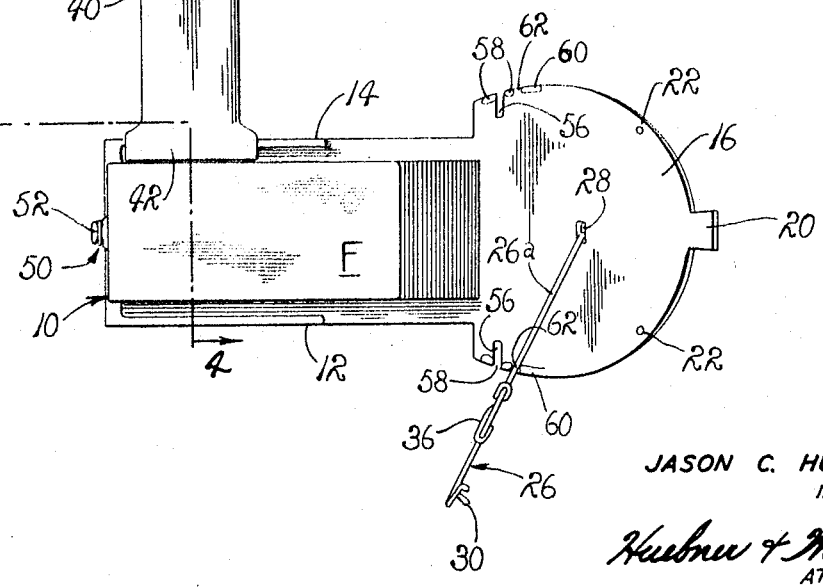
JASON C. HUBBART
INVENTOR
ATTORNEYS

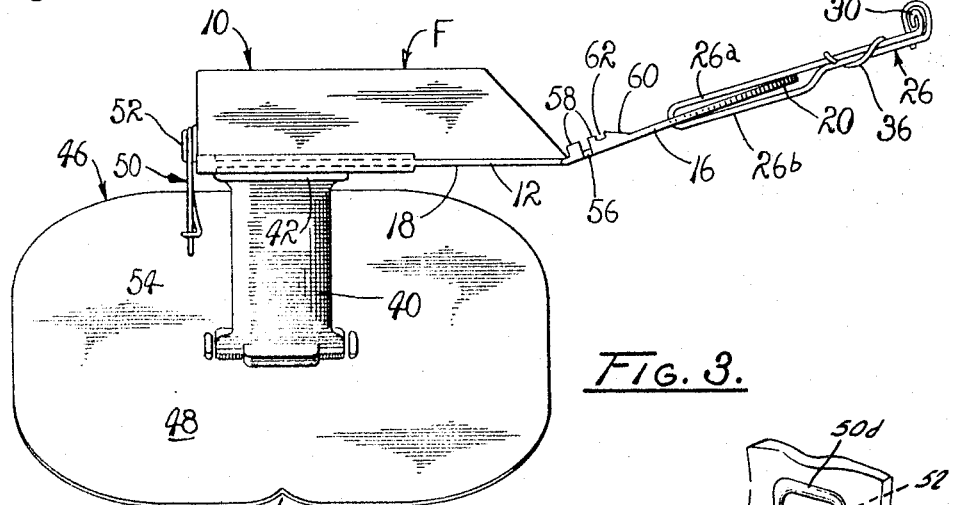
Fig. 3.
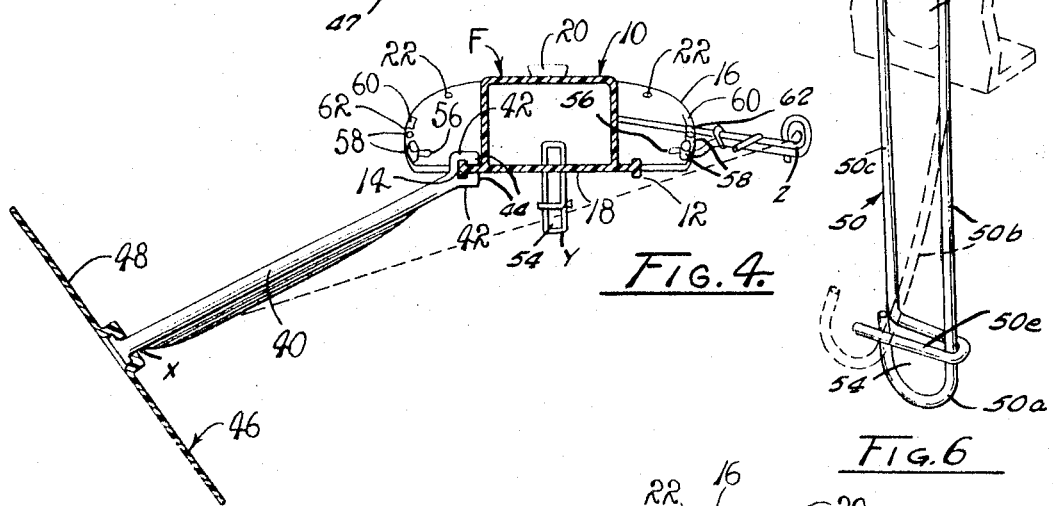
Fig. 4.
Fig. 6
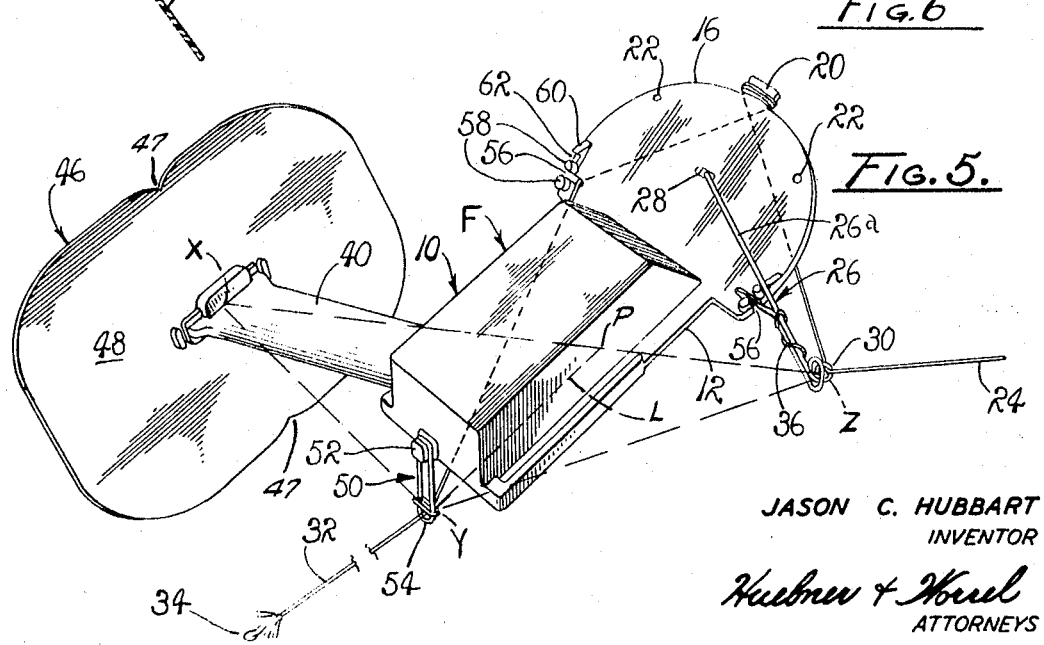
Fig. 5.
JASON C. HUBBART
INVENTOR
Huebner & Worrel
ATTORNEYS

United States Patent Office 3,464,142
Patented Sept. 2, 1969

3,464,142
ANGLING DEVICE
Jason C. Hubbart, 4640 E. Lowe Ave.,
Fresno, Calif. 93702
Filed Aug. 4, 1967, Ser. No. 658,555
Int. Cl. A01k 91/00, 93/00
U.S. Cl. 43—43.13          10 Claims

ABSTRACT OF THE DISCLOSURE

An angling device adapted for use with a fishing line, and lures employed therewith. The angling device has a buoyant body with a pivoted bridle means, an outrigger having a planing surface for tacking operation, the planing surface being disposed substantially parallel to the longitudinal axis of the body, and an improved line connecting means. The line connector has a pair of legs which extend downwardly and below the body and whose distal ends form a guide eyelet. The legs are movable relative to each other. The connector functions such that drag or weight forces of a lure, or the body, do not detract from desired action of the planing surface of the outrigger, or cause undesired actions of the body during operation.

BACKGROUND OF THE INVENTION

In many fishing operations, particularly trolling and stream fishing, it is desirable to displace a fishing line and lure attached thereto, to such a position relative to the angler as to overcome reactions which occur from natural resistances of the line and lure relative to the water. During trolling from a boat, a line and lure attached thereto, under normal circumstances, assume a dragging position substantially parallel to the direction of movement of the boat. In instances where a plurality of persons are trolling from the same boat, entanglement of lines is a common occurrence when the lines are permitted to assume a natural trolling position, controlled by movement of the boat, and the waters being fished.

Undesirable conditions many times exist in stream or river fishing wherein the lure is cast by an angler situated on a bank of a stream. The lure under such conditions drifts downstream until the line is substantially aligned with the direction of water movement and the lure has drifted back to the bank. This has long been recognized by anglers as a normally undesirable action. The lure then must be withdrawn from the water in proximity to the bank, which may not necessarily be the area desired by the angler. Also, during each cast there is only a limited time period within which the lure can be maintained in an area suitable for fishing, and particularly if an undesirable stream condition or impediment is reached by the lure.

Devices have been utilized heretofore in an attempt to overcome these problems. Previously available devices have been found to be limited in their utility, and not adaptable to a variety of stream conditions normally encountered during use. Many such known devices are recognized as not being universally reliable, and are incapable of positioning lures with precision in selected areas. Additionally, many of the prior devices have acted as a permanent drag load on fishing gear even after a fish has been engaged with the lure. Manifestly, this is undesirable and unacceptable to anglers. Additionally, I have found in actual usage, that the device of my previous invention shown in United States Patent No. 3,134,189 is not best suited for use with large or heavy lures connected to the lines, as guided and positioned by the means provided thereon. The construction, when using large or heavy lures connected to the line, tended to depress the rear or tail end of the angling device, with a resultant raising of means comprising a planning surface thereby detracting from the action of the planing surface and rendering the device unstable. It was found that by employing a larger size device with a greater amount of planing surface the instability caused by large or heavy lures was reduced considerably. Such a solution, of course, required the carrying of a number of devices of different sizes to accommodate the range of lures used by the angler. The present invention constitutes an improvement over the device of my previous United States Patent No. 3,134,189, issued May 26, 1964, when utilized under such operational conditions.

STATEMENT OF THE INVENTION

The present invention is primarily adapted to provide a fish lure positioning device which is highly successful and reliable under variable operating conditions and can accommodate a considerable range of fish lures. The device of the present invention includes means to render the mechanism non-functional upon a successful strike being made by a fish.

Means are included in the present invention, as in my previous invention, whereby the angling device, for use in conjunction with a fishing line and lure, is tensionally adjustable to accommodate stream current velocity and direction relative to the angler using the device. Means are incorporated, with respect to the points of attachment of the lines and lures to the device, to insure a positive and steady planing action, and which serve to increase efficiency to maintain the mechanism in a proper position when a line and lure are secured thereto. The improvement consists at least in part of the establishment of axes and planes through which points of attachment are established which overcome and obviate rotational and undesirable angular movements which sometimes occurred in my prior device particularly when utilized with heavy lures.

Additional objects and advantages of the present invention will become more readily apparent upon reference to the following description and accompanying drawings in which:

FIG. 1 is a schematic view of an angling device embodying the principles of the present invention;

FIG. 2 is an enlarged top plan view of the device of FIG. 1;

FIG. 3 is a side elevational view of the device of the present construction, showing in an extended position the bridle arm following a strike by a fish;

FIG. 4 is a sectional view taken on line 4—4 of FIG. 2; and also illustrating, in broken lines, the relationship to the device of a plane defined by certain connection points.

FIG. 5 is a perspective view, further showing in broken lines, respective planes and axes established by the connection points; and FIG. 6 is an enlarged perspective view of the guide member illustrating the disposition of the parts thereof for engaging a fish line.

Since the device of the present invention is closely related to that disclosed in my prior Patent 3,134,189, similar terminology and description are employed herein where deemed appropriate.

Referring more particularly to the drawings, an angling device, and its operation, in accordance with the present invention is basically shown in FIGS. 1 and 2 of the drawings. The device provides a body 10 having opposite sides 12 and 14. The body extends forwardly to form an inclined prow 16. The body is provided with a normally downwardly presented, flat, planing surface, generally designated 18, not shown in detail in the present application, since it is substantially the same as in my previous patent, and includes a bent portion as a continuation of the planing surface to facilitate the planing action of the device.

A frontal protruding tab 20, serving the purpose of an anchorage post for a line, extends forwardly from the prow 16 in substantial alignment with the longitudinal axis of the body 10, and is disposed substantially equidistant between laterally opposed pairs of guide eyelets 22, which are provided in a forward portion of the prow 16. The eyelets serve, as will hereinafter be explained, to permit control and alignment of a fishing line 24 from a fisherman's rod. Rigidly secured to the upper side of the body 10 is a float F, having a displacement capability proportioned according to the gross weight of the device of the invention to achieve the desired buoyancy.

An elongated bridle arm or striker control lever 26 is pivotally mounted in an aperture 28 provided centrally in the prow, in longitudinal alignment with the tab 20. The free end of bridle arm 26 is provided with a loop end, indicated at 30, through which the line 24 is adapted to be inserted and which serves, in conjunction with the remainder of the construction, to permit pivotal movement of the arm and the line 24 engaged therethrough. Movement of the bridle arm 26 controls the direction of pull between the line 24, attached for example to a fisherman's pole, not shown, and a drag created by a leader 32 attachable to the line and restrictively positioned at the rear of the device. The leader normally includes a lure 34 to which, if desired, an appropriate weight, not shown, can be affixed.

The bridle arm 26 is preferably made of wire or other material having a degree of flexibility and is provided with an upper arm portion 26a disposed above the prow 16, which is downwardly extended through the aperture 28, and a lower arm portion 26b disposed below the prow, which is extended outwardly along the upper arm and in conjunction with the outer end of the upper arm formed to provide the loop 30. A resilient clip 36 extends about the upper and lower arm portions outwardly of the prow and is slidable therealong in frictional engagement therewith for holding the arms together and governing the amount of the arm portions that are free to flex. The clip 36 thus serves as a tension adjustment means which regulates the frictional engagement of the bridle arm with a positioning notch hereinafter described. When the clip is moved inwardly, the friction is increased to resist swinging motion of the bridle arm or more dependably to engage it with the positioning notch, while outward movement reduces said frictional engagement.

An outrigger arm, generally designated 40, is provided with laterally opposed gripping flanges in the form of tabs 42, and return-bent flanges 44, the return-bent flanges 44 being integral with the arm. The pair of tabs, and the flanges 44, are spaced to receive therebetween connecting portions of the body 10, thereby to permit selective longitudinal adjustment. The outrigger arm 40 may be removed from one side of the body 10, and projected from the opposite side from that illustrated in the drawings. The outrigger arm 40 carries at its distal end a reaction member 46 having notches 47 formed in its upper and lower edges and a plane surface 48 disposed substantially parallel to the longitudinal axis of the body member 10, and angularly related to the planing surface 18 thereof.

In a preferred embodiment of the device, the outrigger arm 40 and the reaction member 46 are integrally formed of plastic material, such as styrene. This material is light in weight, strong, durable and noncorrosive. The device can be bent and, therefore, the angular relationship between the planing surface 48 and the surface constituting the downwardly disposed planing surface 18 may be selectively adjusted to accommodate the device to particular stream velocities, or fishing conditions encountered.

As can be clearly seen, from FIG. 4 of the drawings for example, the reaction member 46 is normally disposed, in operation, at a level below the planing surface 18 and at an angle of approximately 45° relative thereto. It is significant that outrigger arm 40 has a sufficient area to give a vaning effect, in conjunction with the remainder of the construction, to preclude the reaction member 46 from pivoting the kite or device downwardly excessively about the longitudinal, or roll, axis of the device.

In my previous patent I disclosed line connections and resistance means, operable in connection with the forward face of the prow, which while being generally satisfactory, did result, under certain circumstances in causing a tendency for angular deviation from the horizontal of the device, thereby detracting from its optimum action. The present invention incorporates a construction which overcomes these difficulties, while still utilizing the same basic principles, including frictional engagement of a strike control lever or bridle arm, as referred to in my previous patent, with at least one prow surface.

In order to overcome the difficulties encountered in the previous construction, modifications have been incorporated. Of importance is the incorporation of a guide member, designated generally by reference numeral 50, of wire or the like, frictionally and slidably mounted on a grooved stub or loss 52, which is disposed on a medial longitudinal axis with respect of the main body 10. As shown in FIG. 6, the guide member 50 is formed from substantially firm, but slightly flexible, material having a bent end or hook 50a. The hook is at one end of a leg 50b joined to one end of a generally parallel leg 50c by a transverse connecting portion 50d. The other end of the leg 50c is bent into a laterally disposed U-shaped portion 50e defining a recess into which the hook end 50a is adapted to be received. The legs 50b and 50c are adapted to be disposed in the grooves of the boss 52 in frictional engagement therewith. The guide member is thus adapted for vertical disposition with respect to the body and during operation is downwardly extended. The hook 50a and the U-shaped portion 50e define a line guide eyelet 54 at the lower end of the guide member, through which line 24 or a leader 32 is adapted to pass and carry a lure 34, possibly including a weight thereon. The line or leader is readily and easily disposed in the eyelet by exerting finger pressure on the legs 50b and 50c to move the hook 50a out of the portion 50e, as shown in dash lines in FIG. 6, placing the line or leader in the hook, and releasing finger pressure on the legs, permitting the hook to return within the confines of the portion 50e. This construction permits attachment of the device anywhere along the length of the line and lowering of a lure and weight with respect to the body which, as will be seen hereinafter, places the point of drag on the body below the planing surface thereof.

Slots 56 are provided in proximity to the rear of the prow, and guide stubs 58 are provided on opposite sides of the slots. These slots are adapted for passage therethrough of the line 24, and retainment therein by means of the guide stubs, when a line is attached to the lure control. Inclined surfaces or ramps 60, with their lower ends disposed toward the forward end of the prow are provided for easy positioning of the bridle arm or striker control lever 26, and behind which detent notches 62 are provided. As shown in FIG. 3, the side of each detent notch adjacent to its ramp is provided with a steep incline up which the upper arm portion 26a is adapted to move, the roundness of the material thereof assisting in this respect. Movement of the bridle arm or striker control lever from the detent notches is dependent upon the amount of tension required to move the bridle arm or striker control lever upon a fish strike or the like, and is governed by positioning of the tension adjustment means 36 which governs the amount of the arm portions that are free for flexing.

In operation, the device of United States Patent No.

3,134,189 and that of the present invention are subject to a multiplicity of complexly related forces which actual use and observation have made discernible. For example, it is desired that the body 10 plane on the surface 18 and retain a substantially upright attitude. If it tips too far in the direction of the reaction member 46 or too far in the opposite direction, the controlling effect of the reaction member is lost or impaired and erratic operation results. As will be obvious, if the reaction member dives too deeply in the water or if it assumes too shallow a position, it cannot properly guide, tack or crab the device. However, the maintenance of certain relationship between the elements of the device virtually obviates these difficulties. For example, the three points consisting of the loop end 30 of the bridle arm 26, the eyelet 54 of the guide member 50 and the approximate center of the reaction member 46 may be regarded as establishing an imaginary plane XYZ above which the body 10 is wholly disposed. For proper operation, this plane should be so disposed that any line extended therealong longitudinally of the body 10 should be substantially parallel to the planing surface 18. For example, a plane longitudinally aligned with the guide member would intersect the XYZ plane in a line L and define such a line. It will be appreciated, of course, that the XYZ plane contains many other lines which are parallel to line L and to the planing surface. The guide member can be located anywhere along the rear of the body but, of course, would be slightly longer if nearer the reaction member, and shorter if placed farther therefrom, to establish the aforesaid parallel conditions. Actually the guide member may be slightly longer than required to meet these conditions but should not, for proper operation, be shorter. It will be noted that said plane is approximately although not precisely normal to the reaction member 46. Expressed differently a line drawn between X, the approximate center of the reaction member 46 and Z, the loop end of the bridle arm 26 can be regarded during operation as a pivot axis about which the body 10 tends to pitch or assume a diving or ascending attitude. For proper operation, the eyelet 54 of the guide member 50 should extend downwardly below the planing surface 18 a distance approximately, and at least as great as, the downward spacing of the axis XZ below the planing surface at a point P forwardly aligned with the eyelet with respect to the relative direction of movement of the device through the water.

OPERATION

The operation of the device of the present invention is believed to be readily apparent and is briefly summarized at this point. The functioning of the device of the present invention is otherwise substantially similar to that of the device of my previous patent. The outrigger or reaction member 46 can be mounted on the body member to project from either side thereof. The bridle arm 26 is always extended to the opposite side of the body 10 from the reaction member 46 for guiding or tacking use. The fishing line is normally passed through the loop end 30 in the bridle arm 26, thence around, preferably with a plurality of loops, the front protruding tab 20, under the prow 16, through the slot 56 on the same side of the prow as the reaction member 46, under the float body F, through the line guide eyelet 54 and thence is connected to a desired lure 34. An opposite direction of affixation of the line to the body of the device will be obvious in which, starting with a lure, the hook or leader end of the line is passed through the eyelet 54 in the guide member 50, the line end then passing under the body of float F, through a slot 56 on the same side of the prow as the reaction member 46, thence under the front end of the prow, looped two or three times around the front protruding tab 20, extending through the loop end 30 of the bridle arm 26 and then extended to an angler's pole.

The tension adjustment means 36 determines the pull necessary to disengage the bridle arm 26 from its frictional engagement in the detent notch formed by the inclined surfaces 60. The size of the lure, speed of the current, or the type and size of fish which may be caught, determine the tension which is desired. The closer to the end of the arm the tension adjustment means 36 is positioned, the less the force required to disengage the arm. When the arm is disengaged, it is free to pivot at 28. The drag or other resistance or tension on the leader 32, causes the body 10 substantially to align with the bridle arm 26 and the line 24, rendering the device inoperative for guiding purposes as the fish is reeled in.

It sometimes is desirable to use a leader 32 of substantial length, so as to space the lure 34 an appreciable distance from the device of the present invention. Under the same conditions, it is also frequently desirable to let the device drift to a selected position while holding the lure up off the bottom of the stream to avoid weeds, debris or other obstructions. In such instances, the leader is wrapped around the reaction member 46 behind the outrigger 40, engaging in the notches 47 of the upper and lower edges thereof. The device is then rested on the water and permitted to drift into a desired position, as downstream along a bank, with the lure held up adjacent to the reaction member. When the position is reached, a slight tug on the line 24 serves to cause the leader to start to unwind from the reaction member as the lure trails downstream. When the leader has fully unwound, the reaction member exerts its guiding effect and the device is carried across the current on the radius of the line 24 as the lure trails downstream in predetermined position.

The foregoing operation is identical for boat fishing where forward travel of the boat creates enough forward motion in the water to move the device sidewardly from the boat the desired distance.

While the line 24 is described as extending through the loop 30, as being wrapped about the tab 20, as extending through the opposite slot 56, and as passing through the eyelet 54, during operation the effect is that the line 24 is connected to the outer end of the bridle arm 26 and is tensioned to hold the device against a relatively moving current of water and the leader 32 is connected to the eyelet 54 and imposes a drag thereon which is substantially increased if a fish is hooked by the lure 34.

When utilizing the device for fly fishing, a fly on the end of a short drop line is tied at one of the holes 22, and tension on the main line which extends through the loop end 30 to an angler's pole enables floating and bouncing the fly as desired.

Although the invention has been herein shown and described in what is conceived to be the most practical and preferred embodiment, it is recognized that departures may be made therefrom within the scope of the invention.

Having described my invention, what I claim as new and desire to secure by Letters Patent is:

1. An angling device comprising a buoyant body member having a longitudinal axis, a substantially flat downwardly disposed planing surface, and predetermined relative forward and rearward ends; an outrigger mounted on the body member and laterally and downwardly extended therefrom and providing a substantially flat reaction member substantially parallel to the longitudinal axis of the body member; a bridle arm laterally extended from the forward end of the body member to the side thereof opposite from the outrigger and having an extended end; a line connected to the extended end of the bridle arm and adapted to hold the device against a relatively moving current of water; a substantially rigid member dependingly affixed to the rearward end of the body member and having a free distal end held in substantially fixed relation thereto; and a fish lure connected to the distal end of the affixed member, the center of the reaction member, the point of connection of the fish line to the bridle arm, and the point of connection of the fish lure to the affixed member defining a plane above which the body member is wholly spaced, said plane being transversely tipped toward the reaction member transversely of said planing surface and containing a line disposed substantially parallel to a line extending longitudinally of the planing surface and passing through the point of connection of the fish lure to the affixed member.

2. In an angling device comprising a bouyant body member having a longitudinal axis, a substantially flat downwardly disposed planing surface, and predetermined relative forward and rearward ends; an outrigger mounted on the body member and laterally and downwardly extended therefrom and providing a substantially flat reaction member disposed substantially parallel to the longitudinal axis of the body member and transversely of the body member in a plane oblique to the planing surface; a bridle arm laterally extending from the forward end of the body member to the side thereof opposite from the outrigger and having an extended end; a line connected to the extended end of the bridle arm and adapted to hold the device against a relatively moving current of water; and a fish lure connected to the body member and constituting a drag thereon; the improvement comprising a substantially rigid member dependingly affixed to the rearward end of the body member and having a free distal end to which the fish lure is connected, the center of the reaction member, the point of connection of the fish line to the bridle arm, and the point of connection of the fish lure to the rigid member defining a plane spaced from the planing surface of the body and transversely tipped toward the reaction member transversely of said planing surface, said plane containing lines disposed substantially parallel to the longitudinal axis of the planing surface at different distances therefrom.

3. The device of claim 2 in which the rigid member has a guide eyelet at the distal end thereof and is adjustably mounted on the body member for disposing the eyelet generally in said plane.

4. An angling device comprising a substantially rigid body member having a frontal prow and a longitudinal axis, and incorporating a downwardly presented longitudinally extended planing surface, an outrigger arm extended laterally from said body member in an angularly downwardly disposed direction from said planing surface and having opposite proximal and distal ends, a reaction member fixed to the distal end of said outrigger arm constituting a planing surface disposed substantially parallel to the longitudinal axis of said body member but being angularly related to said planing surface transversely of the body, bridle means having a free end providing an opening therethrough, said bridle means being movably affixed to the prow, said bridle means being adapted for movement from a sidewardly disposed position with respect to the longitudinal axis of said prow, in restricted confinement therewith, to a free forwardly extended position, means for frictionally engaging said bridle means in a position sidewardly disposed with respect to said prow, including rearwardly inclined ramps on opposite sides of said prow defining detent notches adapted for frictional engagement with the bridle arm, said inclined ramps being adapted to facilitate movement of the bridle arm into a restricted position engaged in either of said detent notches, said frictional means being adjustable to determine a force required to displace said bridle means from said side position to a substantially free forward position, downwardly disposed line passage means connected at the rear end of said body member and adapted for passage therethrough of a line or leader for a lure connection thereto at a point below said planing surface, line engaging means extended forwardly of the prow, said prow having an upwardly disposed angular disposition with respect to said extended planing surface, notches provided on opposite sides of said prow in proximity to the rearward end thereof adapted for passage therethrough of a fishing line passing through said line passage means, and a buoyant member secured to said body member at an elevational position above said planing surface.

5. In an angling device of the type comprising a buoyant body having a longitudinal axis and line guide means, bridle means pivoted to the body and swingable to either side of the axis, and said bridle means and guide means being adapted for receiving a fish line; guide means including substantially firm members having a pair of legs extending downwardly from and below the body with distal ends configured to define a guide eyelet, said distal ends being movable relative to each other and providing for ready opening and closing of the eyelet for placement of the fish line therein.

6. In the device defined in claim 5, one of said legs having a bent end, the other leg having a portion defining a recess in which the bent end is received for defining therewith said guide eyelet, said legs being resiliently flexible and movable relative to each other for moving the bent end out of the recess for receipt of the fish line therein.

7. In an angling device of the type comprising a buoyant body having a longitudinal axis, a bridle arm pivoted to the body, and frictional means releasably holding the arm to one side of the axis; said frictional means including a detent notch formed on the body and receiving a portion of the ram for holding it to one side, said arm being resiliently flexible and adapted to be flexed for disengagement thereof from the notch in response to a pull on the arm, and adjustable means on the arm regulating the flexure of the arm and the amount of pull required to disengage it from the notch.

8. In the device of claim 7, said notch being defined by a ramp having a rearwardly inclined surface facilitating receipt of the arm in the notch.

9. The device of claim 1 in which the affixed member is substantially rigid and has a guide eyelet at the distal end thereof, said affixed member being adjustably mounted on the body member for disposing the eyelet generally in said plane.

10. The device of claim 1 in which the bridle arm is held laterally extended by frictional means, said frictional means including a detent notch having a rearwardly inclined surface associated therewith, said notch being adapted to receive a portion of the bridle arm and said surface facilitating placement of the arm portion in the notch.

References Cited
UNITED STATES PATENTS

| | | | |
|---|---|---|---|
| 1,844,652 | 2/1932 | Harley | 24—237 |
| 2,466,939 | 4/1949 | Fowler | 24—237 |
| 2,798,331 | 7/1957 | Westdahl | 43—43.13 |
| 56,857 | 7/1866 | Martin | 43—44.92 |
| 2,293,800 | 8/1942 | Brown | 43—44.95 X |
| 3,134,189 | 5/1964 | Hubbart | 43—43.13 |
| 3,181,266 | 5/1965 | Leufvenius | 43—43.13 |
| 3,299,561 | 1/1967 | Desbois | 43—42.36 X |

SAMUEL KOREN, Primary Examiner

JAMES H. CZERWONKY, Assistant Examiner

U.S. Cl. X.R.

24—237; 43—42.04, 42.22, 42.49, 44.92